US012775721B2

(12) United States Patent
Balmakhtar et al.

(10) Patent No.: US 12,775,721 B2
(45) Date of Patent: Oct. 27, 2026

(54) SYSTEMS AND METHODS FOR ENABLING SECURED COMMUNICATIONS BETWEEN NON-QUANTUM EQUIPPED DEVICES AND QUANTUM EQUIPPED DEVICES

(71) Applicant: T-Mobile Innovations LLC, Overland Park, KS (US)

(72) Inventors: Marouane Balmakhtar, Fairfax, VA (US); Serge Manning, Plano, TX (US)

(73) Assignee: T-Mobile Innovations LLC, Overland Park, KS (US)

( * ) Notice: Subject to any disclaimer, the term of this patent is extended or adjusted under 35 U.S.C. 154(b) by 263 days.

(21) Appl. No.: 18/427,706

(22) Filed: Jan. 30, 2024

(65) Prior Publication Data

US 2025/0245360 A1 Jul. 31, 2025

(51) Int. Cl.
*G06F 21/60* (2013.01)

(52) U.S. Cl.
CPC .................................. *G06F 21/606* (2013.01)

(58) Field of Classification Search
CPC . G06F 21/606; H04L 9/3213; H04L 63/0807; H04L 9/0852
See application file for complete search history.

(56) References Cited

U.S. PATENT DOCUMENTS 12,231,549 B1 * 2/2025 Stapleton .............. H04L 9/0852
2023/0232220 A1 * 7/2023 Low ...................... H04L 9/0662
726/2

(Continued)

FOREIGN PATENT DOCUMENTS

CN 105812367 A * 7/2016 ......... H04L 63/0869
EP 4597920 A1 8/2025
WO 2021090027 A1 5/2021

OTHER PUBLICATIONS

Chen H, Jia H, Wu X, Wang X, Wang M. Quantum token for network authentication. In2021 IEEE International Conference on Web Services (ICWS) Sep. 5, 2021 (pp. 688-692). IEEE. (Year: 2021).*

(Continued)

*Primary Examiner* — Lynn D Feild
*Assistant Examiner* — Ethan V Vo

(57) ABSTRACT

A quantum communication system for enabling secured communications between non-quantum equipped and quantum equipped devices comprises a non-quantum equipped network device configured to transmit a connection request, a quantum authentication server configured to verify a connection between the non-quantum equipped network device and a quantum network gateway, the quantum network gateway enabling communications between the non-quantum equipped network device and the quantum authentication server. The quantum network gateway includes at least one quantum processor, and a quantum application, which when executed by the quantum processor, cause the quantum application to receive, from the non-quantum equipped network device, a request to communicate with an application server, generate a quantum token, transmit the quantum token to the quantum authentication server for authentication of the communication request, and set up, a communication tunnel between the quantum network gateway and the application server for communicating on behalf of the non-quantum equipped network device.

20 Claims, 7 Drawing Sheets

(56) References Cited

U.S. PATENT DOCUMENTS

| | | | | |
|---|---|---|---|---|
| 2023/0244972 | A1* | 8/2023 | Griffin | G06N 10/80 706/62 |
| 2023/0281500 | A1* | 9/2023 | Griffin | G06N 10/80 706/62 |
| 2023/0353348 | A1* | 11/2023 | Ganguly | H04L 9/0855 |
| 2025/0038968 | A1* | 1/2025 | Foo | H04L 9/40 |
| 2025/0112897 | A1* | 4/2025 | Verma | H04L 63/029 |

OTHER PUBLICATIONS

Foreign Communication From a Related Counterpart Application, Extended EP Search Report and EP Search Opinion dated Jun. 30, 2025 EP Application No. 25151270.3.

* cited by examiner

SYSTEMS AND METHODS FOR ENABLING SECURED COMMUNICATIONS BETWEEN NON-QUANTUM EQUIPPED DEVICES AND QUANTUM EQUIPPED DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication networks may provide wireless data services to network devices such as far edge devices and user equipment. These network devices may require secure communications to a remote server in order to perform their functions. Secure communications may be required to authenticate the network device with a service provider computer or other server computer in order for the network device to receive information or services. This authentication may entail the exchange of data between the network device and a wireless communication network or server so that the network or server may confirm the identity of the network device. Once authentication is successful, communication in the network, may be secured by using encryption and decryption techniques or other security measures to ensure that data is securely transmitted and received between two or more devices.

SUMMARY

In an embodiment, a quantum communication system for enabling secured communications between non-quantum equipped and quantum equipped devices, comprises a non-quantum equipped network device configured to transmit a connection request with first security credentials, wherein the first security credentials includes a first identifier of the non-quantum equipped network device, a quantum authentication server comprising one or more quantum processors, one or more memories coupled to the one or more quantum processors, and configured to store instructions. The instructions, when executed by the one or more quantum processors, cause the quantum authentication server to be configured to verify the connection request using the first security credentials to verify a connection between the non-quantum equipped network device and a quantum network gateway, the quantum network gateway, enabling communications between the non-quantum equipped network device and the quantum authentication server. The quantum network gateway comprises at least one quantum processor, at least one memory coupled to the at least one quantum processor and one or more processors, and a quantum application comprising instructions stored in the at least one memory. The quantum application when executed by the at least one quantum processor, cause the quantum application to receive, from the non-quantum equipped network device, a communication request to communicate with an application server in a network, wherein the communication request includes the first security credentials and a server type identifying a type of the application server, generate a quantum token based on the first security credentials, the communication request, the server type, and a second security credentials, wherein the second security credentials include a second identifier of the quantum network gateway and transmit, the quantum token to the quantum authentication server for authentication of the communication request wherein the quantum authentication server further comprises a quantum authentication application, and wherein the one or more quantum processors of the quantum authentication server is configured to execute the quantum authentication application to verify the first security credentials, the second security credentials, and the server type, and determine whether the non-quantum equipped network device is permitted to communicate with the application server based on the first security credentials, and set up, a communication tunnel between the quantum network gateway and the application server for communicating on behalf of the non-quantum equipped network device in response to the non-quantum equipped network device being permitted to communicate with the application server.

In another embodiment, a method for enabling secured communications between non-quantum-equipped devices and quantum-equipped devices is disclosed. The method comprises initiating, by a non-quantum equipped network device, a connection request between the non-quantum equipped network device and a quantum network gateway communicatively coupled to the non-quantum equipped network device, in which the connection request comprises first security credentials of the non-quantum equipped network device, the first security credentials including a first identifier of the non-quantum equipped network device. The method also comprises verifying, by a quantum authentication server, the connection request based on the first security credentials and second security credentials of the quantum network gateway, the second security credentials of the quantum network gateway including a second identifier of the quantum network gateway, in which the quantum authentication server is communicatively coupled to the quantum network gateway, and receiving by the quantum network gateway, from the non-quantum equipped network device, a communication request to communicate with an application server in a network, in response to verifying the connection request, in which the communication request includes the first security credentials and a server type identifying a type of the application server. The method further comprises generating, by the quantum network gateway, a quantum token based on the first security credentials, the communication request, the server type, and the second security credentials, transmitting, by the quantum network gateway, the quantum token to the quantum authentication server for authentication of the communication request, authenticating, by the quantum authentication server, the communication request by, verifying the first security credentials, the second security credentials of the quantum network gateway and the server type, and determining whether the non-quantum equipped network device is permitted to communicate with the application server. The method further comprises providing, by the quantum authentication server, cryptographic keys to the quantum network gateway and the application server for quantum-based encryption and decryption of communication between the quantum network gateway and application server, in response to the authentication of the communication request, and setting up, by the quantum network gateway, a quantum secured communication tunnel between the quantum network gateway and the application server for communicating on behalf of the non-quantum equipped network device, in which the communication flowing through the quantum secured communication tunnel is encrypted and decrypted by the application server, using the cryptographic keys.

In yet another embodiment, a method for enabling secured communications between non-quantum-equipped devices and quantum-equipped devices is disclosed. The method comprising verifying, by a quantum authentication server, a connection request between a non-quantum equipped network device and a quantum network gateway communicatively coupled to the non-quantum equipped network device, based on a first security credentials of the non-quantum-equipped device and a second security credentials of the quantum network gateway transmitted to the quantum authentication server by the quantum network gateway, in which the quantum authentication server is communicatively coupled to the quantum network gateway, and receiving, by the quantum network gateway, a communication request to communicate with an application server in a network, from the non-quantum equipped network device, in response to verifying the connection request by the quantum authentication server, in which the communication request includes the first security credentials and a server type identifying a type of the application server. The method further comprises generating, by the quantum network gateway, a quantum token based on the first security credentials, the communication request, the server type, and the second security credentials of the quantum network gateway, in which the second security credentials of the quantum network gateway include a second identifier of the quantum network gateway, transmitting, by the quantum network gateway, the quantum token to the quantum authentication server for authentication of the communication request, and authenticating, by the quantum authentication server, the communication request by verifying the first security credentials, the second security credentials, and server type. The method further comprises determining whether the non-quantum equipped network device is permitted to communicate with the application server, and providing, by the quantum authentication server, cryptographic keys to the quantum network gateway and the application server, for quantum-based encryption and decryption of communication between the quantum network gateway and the application server, in response to the authentication of the communication request. The method further comprises, setting up, by the quantum network gateway, a quantum secured communication tunnel between the quantum network gateway and the application server, for communicating on behalf of the non-quantum equipped network device, in which communication flowing through the quantum secured communication tunnel is encrypted and decrypted by the application server, using the cryptographic keys, and assigning, by the quantum authentication server, a data storage associated with the application server, and storing, by the application server, quantum encrypted data at the data storage, for later retrieval by the application server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
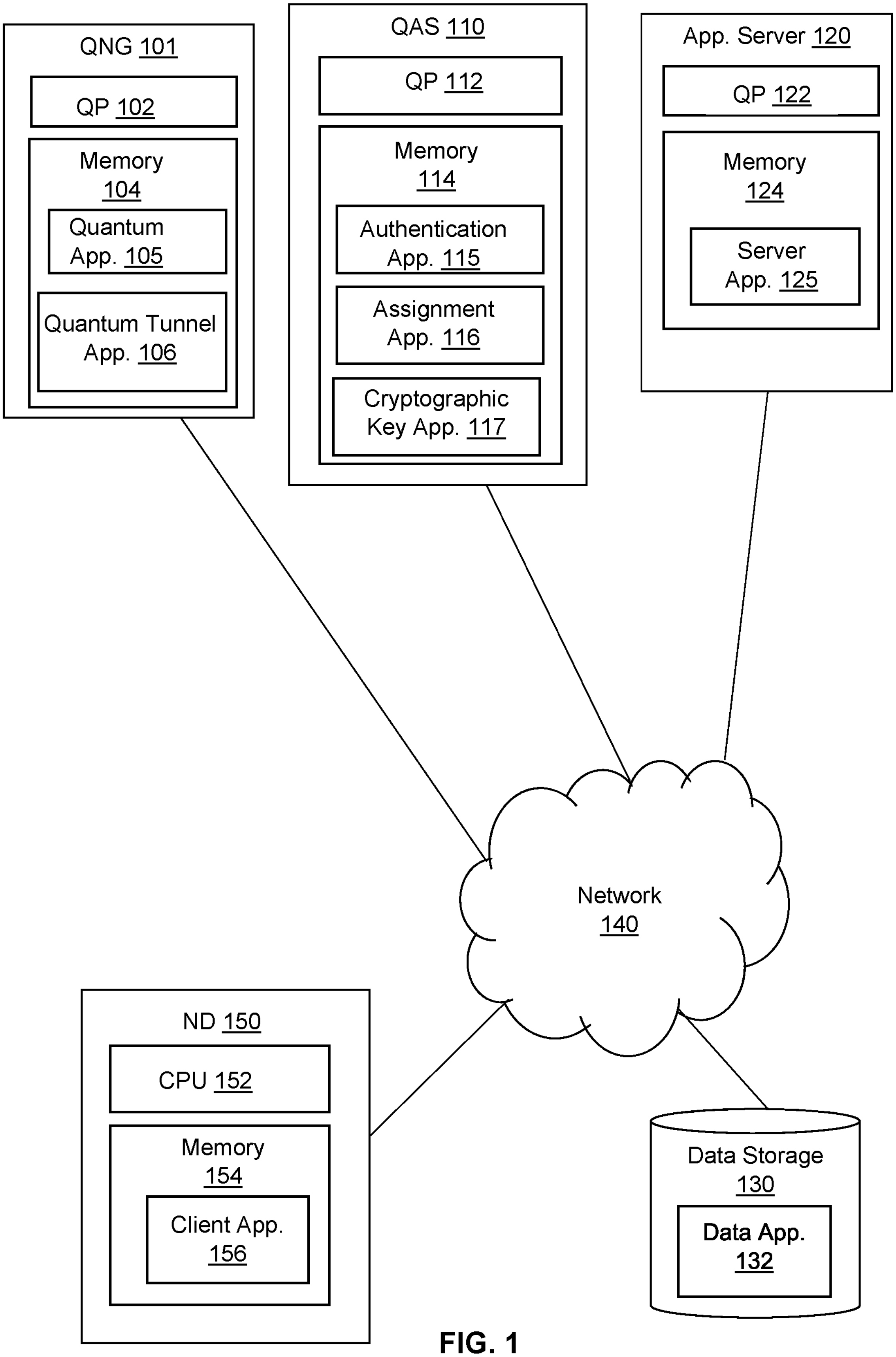
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Network devices, and applications hosted at different servers may communicate through secure channels. Examples of network devices include user equipment (UE) and far edge devices. As used herein, far edge devices refer to computing devices that may be located at the outermost edge of a network, often in remote or distributed locations. Far edge devices may be capable of performing edge-based computing by processing data closer to the users or customers rather than relying solely on centralized cloud resources. Examples of far edge devices include home gateways and enterprise consumer premises equipment. On the other hand, a UE may refer to user devices, for example, a mobile phone, a tablet, a wearable device, a laptop computer, a desktop computer, etc. These network devices may include applications that communicate with an application server through a secure channel to exchange application related data and provide services to the network devices.

A secured communication network may employ various measures to protect the confidentiality, integrity, and availability of data transmitted between a network device and other devices and servers in the network. For example, data may be encrypted and then sent across a communication channel such that, even if intercepted, the data remains unreadable without the proper decryption key. In some instances, virtual private networks (VPNs) may be implemented to establish secure, encrypted communication channels over public networks.

However, the advent of quantum computing may pose a significant threat to ensuring the security and privacy of data transmission between different types of devices, and more particularly, may cause technical challenges when performing data encryption and decryption processes on communications between quantum equipped devices and non-quantum equipped devices. For example, quantum equipped devices and non-quantum equipped devices (e.g., UE, and far edge devices) may operate using fundamentally different principles, and directing communications between them may be challenging. This may be because quantum equipped devices have quantum-based components (e.g., quantum processors) that may perform quantum-based encryption and decryption schemes, which are faster and far more secure compared with non-quantum equipped devices that have processors that may be incapable of performing quantum-based encryption and decryption schemes (or performing such schemes may take a very long time (e.g., hundreds of years).

Quantum-based communications use quantum computing techniques, which leverage the laws of quantum physics to enable secure and advanced encryption/decryption algorithms and methods of data transmission. Unlike non-quantum-based communications, quantum-based communications use quantum bits or qubits to perform various computations and applications. Quantum devices may be equipped with the hardware and software to process, use, and store qubits, but non-quantum devices may not be equipped with the requisite quantum computing enabled hardware and software. For example, in a communication network with different types of devices, a non-quantum equipped device may not be able to communicate effectively with a quantum equipped device or perform a quantum-based function. This is primarily because the non-quantum equipped device may only be able process data using components that may not be equipped for quantum computing (i.e., may not be capable of processing, encrypting, or decrypting data that has been subject to quantum computation schemes), thereby causing dropped or discarded data or extended processing times. In some instances, the quantum properties of the transmitted data may be lost entirely. Moreover, quantum computing has the potential to break non-quantum encryption schemes by efficiently solving the underlying mathematical problem. For example, encryption that may take approximately 100 years to decrypt using non-quantum computing techniques may be reduced to weeks, days, or even hours through the use of quantum computing.

Encryption is used to protect billions of transactions every day, for example, transport layer security (TLS) for online shopping, digital banking, highly sensitive government communications, digital asset transfer and authentication, etc. These transactions rely on trusted and secured means for two or more transaction parties to share a secure key, allowing data to be encrypted by one party and subsequently decrypted by the other party. However, as the world moves towards an era of quantum computing technology, transactions which use non-quantum techniques and protocols for encryption and decryption, may be vulnerable and incapable of withstanding attacks from quantum-based processing equipment and software systems. For example, if a key exchange protocol is compromised or broken, the encrypted data may be exposed to attackers. This is of particular concern to both large and small businesses, organizations, and individual users of public and private networks (e.g., the internet or corporate intranets).

Additionally, network devices include both non-quantum equipped network devices and quantum equipped network devices. For network devices to communicate effectively, a set of characteristics for computing may have to be present. These set of characteristics may be different between quantum equipped network devices that leverage quantum computing techniques, and non-quantum equipped network devices that may be incapable of performing quantum computing. For example, current 5G devices may be non-quantum equipped and incapable of performing quantum-based functions. Beyond 5G, these non-quantum equipped network devices may immediately become obsolete and unable to communicate effectively with quantum equipped network devices. Thus, in the face of evolving technology and cybersecurity threats in networks or systems that may include non-quantum equipped devices, systems and methods that facilitate communication between different types of network devices, and secure communications between non-quantum equipped devices and quantum-equipped future networks may be useful.

The present disclosure addresses the foregoing technical problems by providing a technical solution in the technical field of quantum cryptography. The systems and methods disclosed herein introduces a quantum network gateway (QNG) into a communication network to facilitate communications between different types of devices in the communication network, and a quantum-based authentication and encryption method that leverages quantum-resistant encryption techniques to secure the communications between non-quantum equipped devices and quantum equipped networks and application servers. Quantum-resistant encryption techniques, also known as post-quantum cryptography or quantum-safe cryptography, refer to cryptographic algorithms and protocols designed to resist attacks by quantum computers. Particularly, systems and methods disclosed herein, may use a QNG integrated into a network communication system to facilitate communications between non-quantum equipped devices and quantum equipped devices, integrate quantum authentication functionality into non-quantum based authentication functions, construct a quantum protected communication tunnel for data flow between the different types of devices, and introduce quantum computing capabilities for data encryption and decryption in a network including non-quantum equipped network devices.

A communication network may include a QNG having at least one quantum processor and a quantum application which may be executed by the quantum processor of the QNG. The communication network may also include different types of devices, such as a non-quantum equipped network device (e.g., far edge device or user equipment) a quantum authentication server (QAS), application servers, and data storage, some of which may be quantum equipped, and some of which may only be accessed using specific security credentials or by specific network devices. The QNG may be located at the edge of the network, and communicatively coupled to the QAS and the non-quantum equipped network device. The QNG may be responsible for receiving and transmitting secure data between the different types of devices in the communication network.

For example, a non-quantum equipped network device may need to communicate or use an application implemented on a quantum equipped application server in the network, and the quantum equipped application server may require specific security credentials or allow only specific network devices to access the application. The QNG may facilitate authentication of the non-quantum equipped network device by receiving the necessary security credentials from the non-quantum equipped network device, and generating a quantum token for authentication by an authentication device such as a QAS or authentication application executed by the QAS. The QNG may also facilitate communication between the different types of devices by setting up a communication tunnel between the QNG and the quantum equipped network device (e.g., the application server) for communicating on behalf of the non-quantum equipped network device. The communication tunnel may use quantum-resistant encryption techniques for securing communications on behalf of the non-quantum equipped network device. The QNG may introduce quantum-resistant encryption and decryption techniques for storing and retrieving data stored on behalf of the non-quantum equipped network device by the application server. In this way, the systems and methods disclosed herein enable non-quantum equipped network devices and quantum equipped network devices to communicate effectively through a QNG and create the secure communication tunnel. This in turn may protect data flow through the network, while decreasing instances of dropped or discarded data and extended processing times and preserving the reliable and robust quantum properties of the data exchange. Therefore, the use of the QNG and quantum-resistant encryption techniques disclosed herein enhances the overall integrity of secured communications in networks with different types of devices. Additionally, the systems and methods disclosed herein allow for control over who may access and/or share data, by granting access to applications or data based on authentication of the security credentials of the non-quantum equipped network device.

In an embodiment, a user of a non-quantum equipped network device may execute a client application stored in the memory of the non-quantum equipped network device, which may cause the non-quantum equipped network device to transmit to a QNG in a network, a connection request to connect with the QNG. The QNG enabling communication between the non-quantum equipped network device and a quantum authentication server (QAS), may transmit the connection request to the QAS for verification. The QAS may include one or more quantum processors and a quantum authentication application that when executed, may allow the QAS to verify the connection request. The QAS may receive security credentials of the non-quantum equipped network device and QNG to verify the connection request, and ensure that the connection is secure and authorized. The security credentials of the non-quantum equipped network device and the QNG may include any data or information that identifies the non-quantum equipped device and the QNG. For example, the QAS may include a database with identifications of network devices that are permitted to connect with other devices in the network, from which the QAS may verify the identities of the non-quantum equipped network device and the QNG. The verification process may include other steps, such as a parameter exchange and a confirmation, which are not limited herein. Upon verifying the security credentials of the non-quantum equipped network device and the QNG security credentials, the non-quantum equipped network device may connect with the QNG.

Once the non-quantum equipped network device is connected with the QNG, the non-quantum equipped network device may transmit to the QNG, a communication request to communicate or use an application implemented on an application server in the network. The quantum application of the QNG may receive the communication request from the non-quantum equipped network device to communicate with the application server in the network. However, verification of the security credentials of the non-quantum equipped network device and the QNG security credentials may not be enough to give the non-quantum equipped network device access to applications running on an application server in the network because the application server may be a different type of device (e.g., a quantum equipped device) and may perform authentication based on specific security credentials for accessing the application.

The quantum application of the QNG may generate a quantum token based on the security credentials of the non-quantum equipped network device, QNG security credentials, and the application server type. The QNG may then transmit the quantum token to the QAS for authentication. Quantum token as used herein, refers to a unique and secure identifier which serves as a cryptographic key for validating the authenticity of a device and may be used to enforce access control policies and ensure that only authorized non-quantum equipped devices have access to certain types of applications or data in a network. In other words, a quantum token could refer to a digital or cryptographic token that is specifically designed to facilitate and secure a quantum communication process. For example, the "quantum token" descriptor may imply that the token is associated with quantum technologies or protocols, often used to authenticate, authorize, or secure communication in quantum networks. The quantum method that could be used to generate the quantum token may be technology agnostic regardless of the technology or protocol being used. For example, a quantum token may include any cryptographic material, quantum encrypted security credentials or some other form of quantum encrypted identification, used for authentication by the QAS.

The quantum authentication application of the QAS may authenticate the communication request by first verifying the security credentials of the non-quantum equipped network device, and QNG security credentials as described above, and next, determine whether the non-quantum equipped network device is permitted to communicate with the application or type of application server the non-quantum equipped network device is trying to access. The QAS may leverage its own quantum processor to assess the quantum token's authenticity and validity, utilizing quantum principles. In some instances, the non-quantum equipped network device may only be authorized to access an application running on the application server when certain conditions are met. For example, only quantum tokens corresponding to certain non-quantum equipped network devices (based on identities stored at the QAS) may be permitted to access the application within the application server or the application server. The non-quantum equipped network device access to the application server may also be defined by the non-quantum equipped network device presence in a security group that is mapped specifically to the application or application server, to maintain data privacy and security.

In this way, the quantum authentication application of the QAS uses the quantum token to verify the identities of the non-quantum equipped network device and the QNG, and may cross reference the identities of the non-quantum equipped network device and the QNG with a list of access or security groups to which the QNG and non-quantum equipped network device belongs. Thus, access to the application server by the non-quantum equipped network device may be defined by the non-quantum equipped network device presence in a security group that is mapped specifically to the application the non-quantum equipped network device is requesting to access. In some embodiments, the QAS may cross-reference the identities of the non-quantum equipped network device and the location of the QNG (based on the QNG identifier) so that access to the application server by the non-quantum equipped network device may be based on the location of the QNG. In this instance, access control through location verification may involve cross-referencing the identified location of the QNG with the geospatial data of the non-quantum equipped network device, thereby establishing a secure and context-aware authentication process. By incorporating the geographical data, the system may enhance security measures, ensuring that the communication is authorized only when the QNG is within a predefined proximity in reference to the specified non-quantum equipped network device. In addition to the foregoing, the QAS may leverage behavioral analytics to evaluate the historical behavior and usage patterns of the non-quantum equipped network device to maintain access control. This process may involve maintaining a behavioral profile for each non-quantum equipped network device (e.g., typical usage times, transaction history, communication protocols, etc.) and analyzing past interactions and communication patterns of the non-quantum equipped network device within the network to determine what types of applications or data the non-quantum equipped network device may have access to. In this manner, historical data of past interactions and communication patterns may be continuously updated as the non-quantum equipped network device interacts within the network over time. This allows the communication system to control access to sensitive information in the network. In some instances, a non-quantum equipped network device present in a security group mapped to an application or application server may still not be able to access the given application or the application server when access to the application or application server is restricted for business or operational reasons. The QAS may also be programmed to update access to the different applications or application servers regularly, based on specific rules or conditions. For example, a policy may define that access to a particular application is to be updated according to a predetermined schedule, or based on regulatory or organizational requirements.

Based on the outcome of the authentication, the QAS may either grant or deny the communication request for the non-quantum equipped network device to communicate with the application or application server. When access is granted, the QAS may assign a particular application server to the QNG, and return an application server identification to the QNG for identifying the particular application server. Assigning a particular application server to the QNG, and returning an application server identification to the QNG may be in the form of a quantum token exchange (i.e., quantum encrypted data contained in a token) between the QNG and the QAS. Upon granting the communication request, a quantum tunnel application executed by the QNG may set up a communication tunnel between the QNG and the application server for communicating with the application server on behalf of the non-quantum equipped network device. The QAS may provide quantum encryption and decryption keys to the QNG and the application server to encrypt and decrypt data flowing through the communication tunnel between the QNG and the application server, and thereby secure the communications flowing through the communication tunnel.

The QNG may then receive data from the non-quantum equipped network device, and may transmit the data through the communication tunnel to the application server. The application server may include a quantum processor and server application that may process and encrypt or decrypt the transmitted data using the quantum encryption and decryption keys provided by the QAS. To this end, data that is quantum secured may be exchanged between the QNG and the application server through the communication tunnel on behalf of the non-quantum equipped network device. Specifically, data entering and exiting the communication tunnel may be quantum encrypted.

In an embodiment, the QAS may also assign a particular data storage that is equipped for storage of quantum encrypted data for the application server and exchange authorization data that may be used for accessing and processing data in the data storage, with the application server and data storage. The application server may set up quantum security with the data storage to encrypt and decrypt any application data at rest. For example, any information the application server stores over time (greater than a few moments) may be encrypted and stored in the data storage for later retrieval and decryption. The QAS may assign a data storage based on general policy rules. For example, the QAS may assign a particular data storage based on the privacy requirements of the application. In some instances, the QAS may assign a data storage based on the identity and location of the device/user and application server. For example, the QAS may assign a data storage located in the same region as where the application server is located or may assign the same data storage for all customers or users of an enterprise. In other instances, when the application server has been previously assigned a particular data storage for a particular user or device, the QAS may select the same data storage for the application server. Additionally, the QAS may verify the identity of the data storage to ensure the QAS can communicate securely with the data storage. Therefore, the QAS assigns a data storage for the application server, generates quantum encryption/decryption keys, and sends the quantum encryption/decryption keys to the data storage. Since data stored in the data storage may be held for a period of time, the quantum encryption/decryption keys provided by the QAS to the QNG may be retained by the QNG even after the communication tunnel is removed or for a certain period of time as may be defined by policy. In some embodiments, there may be multiple data storages for different kinds of data. Furthermore, assigning a data storage may also depend on the requirements of the application (e.g., how much storage is required or needed, and how long the data may be retained) and may vary between different data storage. In this manner, data received from the communication tunnel is decrypted by the application server, and if needed to be retained for an extended period of time, re-encrypted by the application server and stored in the data storage.

Turning now to FIG. 1, a communication system 100 according to an embodiment of the disclosure is shown. In an embodiment, the system 100 comprises a non-quantum equipped network device (network device-ND) 150, a quantum network gateway (QNG) 101, a quantum authentication server (QAS) 110, an application server 120, data storage 130, and a network 140. The ND 150 may be a cell phone, a mobile phone, a smart phone, a personal digital assistant (PDA), an Internet of things (IoT) device, a wearable computer, a headset computer, a laptop computer, a tablet computer, or a notebook computer including one or more processors (e.g., CPU 152), one or more memories 154 and client application 156 stored in the one or more memories for transmitting and receiving data. The ND 150 may be communicatively coupled to QNG 101 via network 140 using a wired or wireless communication link into network 140. Network 140 may be one or more private networks, one or more public networks, or a combination thereof. The wireless communication link may be provided through a cell site, the cell site providing wireless communication links to ND 150 according to a 5G, a long term evolution (LTE), a code division multiple access (CDMA), or a global system for mobile communications (GSM) wireless telecommunication protocol. The ND 150 may carry on wireless communication based on frequency parameters and/or wireless telecommunication protocol selection parameters stored in a non-transitory memory of ND 150. In an embodiment, the frequency parameters may be reprogrammed over-the-air, for example via a configuration command received by ND 150 from a cell site. In another embodiment, the frequency parameters may be reprogrammed via a wired communication link, for example via a docking station or via a recharging plug. The ND 150 may communicate with other devices via the wireless links provided by the cell sites and via wired links provided by network 140.

The QNG 101 may be a computer system, software/hardware, with one or more processors and at least one quantum processor. The QNG may also include memories, and/or network resources used to implement one or more applications, and facilitate communications between ND 150 and different types of devices in the network (e.g., between non-quantum equipped devices and quantum equipped devices) as described herein. For example, QNG 101 may be embodied in a hardware which may include one or more processors and at least one quantum processors, for example, quantum processor (QP) 102. QNG 101 may also include one or more memories 104 and data stores, quantum application 105, and quantum tunnel application 106. Quantum application 105, and quantum tunnel application 106 may be executable instructions stored at the one or more memories 104, for execution by QP 102 of QNG 101. The quantum application 105 may perform the steps and methods described herein to receive a communication request from ND 150 to communicate with an application server 120 in network 140, generate a quantum token based on the security credentials of the ND 150, security credentials of QNG 101, and the application server type, and transmit the quantum token to QAS 110 for authentication. Quantum tunnel application 106 may perform the steps and methods described herein to set up a communication tunnel between QNG 101 and application server 120 for communicating on behalf of ND 150, and introduce quantum encryption/decryption processing provided by QAS 110 to the data flowing through the communication tunnel as further described herein.

The QAS 110 may be a computer system, server software/hardware, with one or more quantum processors. QAS 110 may also include memories, and/or network resources used to implement one or more applications to verify a connection request between ND 150 and QNG 101, and authenticate a communication request between ND 150 and an application server in the network (e.g., application server 120) as described herein. For example, QAS 110 may be embodied in a hardware which may include one or more quantum processors (e.g., QP 112), one or more memories 114 and data stores. QAS 110 may include quantum authentication application 115, which may be executable instructions stored at the one or more memories 114, for execution by QP 112 of QAS 110. Quantum authentication application 115 may perform the steps and methods described herein to verify a connection request by ND 150 to connect with QNG 101 by verifying the security credentials of ND 150 and QNG 101 transmitted by QNG 101. Quantum authentication application 115 may also authenticate a communication request from ND 150 to communicate with application server 120 by verifying the security credentials of ND 150 and QNG 101, and may further determine whether ND 150 is permitted to communicate with application server 120 or use an application implemented in application server 120.

QAS 110 may include a quantum assignment application 116 for assigning a particular application server 120 to QNG 101 based on the type of application ND 150 is trying to access, upon authenticating the communication request. Quantum assignment application 116 may be executable instructions stored at the one or more memories 114, for execution by QP 112 of QAS 110. Quantum assignment application 116 may also assign data storage (e.g., data storage 130) associated with application server 120 for storing quantum encrypted data by application server 120 for later retrieval. QAS 110 may also include a quantum cryptographic key application 117, which may be executable instructions stored at the one or more memories 114, for execution by QP 112 of QAS 110. Quantum cryptographic key application 117 may perform the steps and methods described herein to provide quantum encryption/decryption keys to QNG 101, application server 120, and data storage 130 as further described herein.

In one embodiment, the QAS 110 may be responsible for verifying the identities of the QNG 101 and the data storage 130, distributing the keys to the application server 120 and data store 130, and assigning the data store 130 for the application server 120. In another embodiment, the QNG 101 may be responsible for verifying the identities of the QNG 101 and the data storage 130, distributing the keys to the application server 120 and data store 130, and assigning the data store 130 for the application server 120.

The application server 120 may be a computer system, server software/hardware, or one or more processors, memories, and/or networking resources, used to implement an application platform. For example, application server 120 may be embodied as a cloud-based system, which includes one or more processors (e.g., QP-122), memory 124 and server application 125. The application platform may refer to the underlying infrastructure of application server 120 and software framework that supports development, deployment, and execution of server application 125. Server application 125 may perform the steps and methods described herein to encrypt and decrypt communication exchange through the communication tunnel between QNG 101 and application server 120 as described herein, thereby creating a quantum secured communication tunnel between the QNG 101 and the application server 120, for communicating on behalf of the ND 150.

The communication system 100 may also include a data storage 130 as described above. Data storage 130 may include data application 132, which may be executable instructions stored at data storage 130, for execution by one or more processors of data storage 130. Data application 132 may perform the steps and methods described herein to store quantum encrypted and decrypted data flowing through the communication tunnel for later retrieval by application server 120.

While FIG. 1 only shows one ND 150, one QNG 101, one QAS 110, one application server 120 and one data storage 130, it should be appreciated that the communication system 100 may include any number of NDs, QNGs, QASs, application servers and data storage depending on the utilization of the communication system 100. The process of verifying a connection request (e.g., connection request 222) and authenticating a communication request (e.g., communication request 332) ensures the integrity of the entire communication within the network (e.g., Network 140) including communications between non-quantum equipped network devices (e.g., ND 150) and quantum equipped network devices (e.g., QAS 110 and Application server 120) in the network, and thereby prevent potential attacks or unauthorized access.

Figure 2:
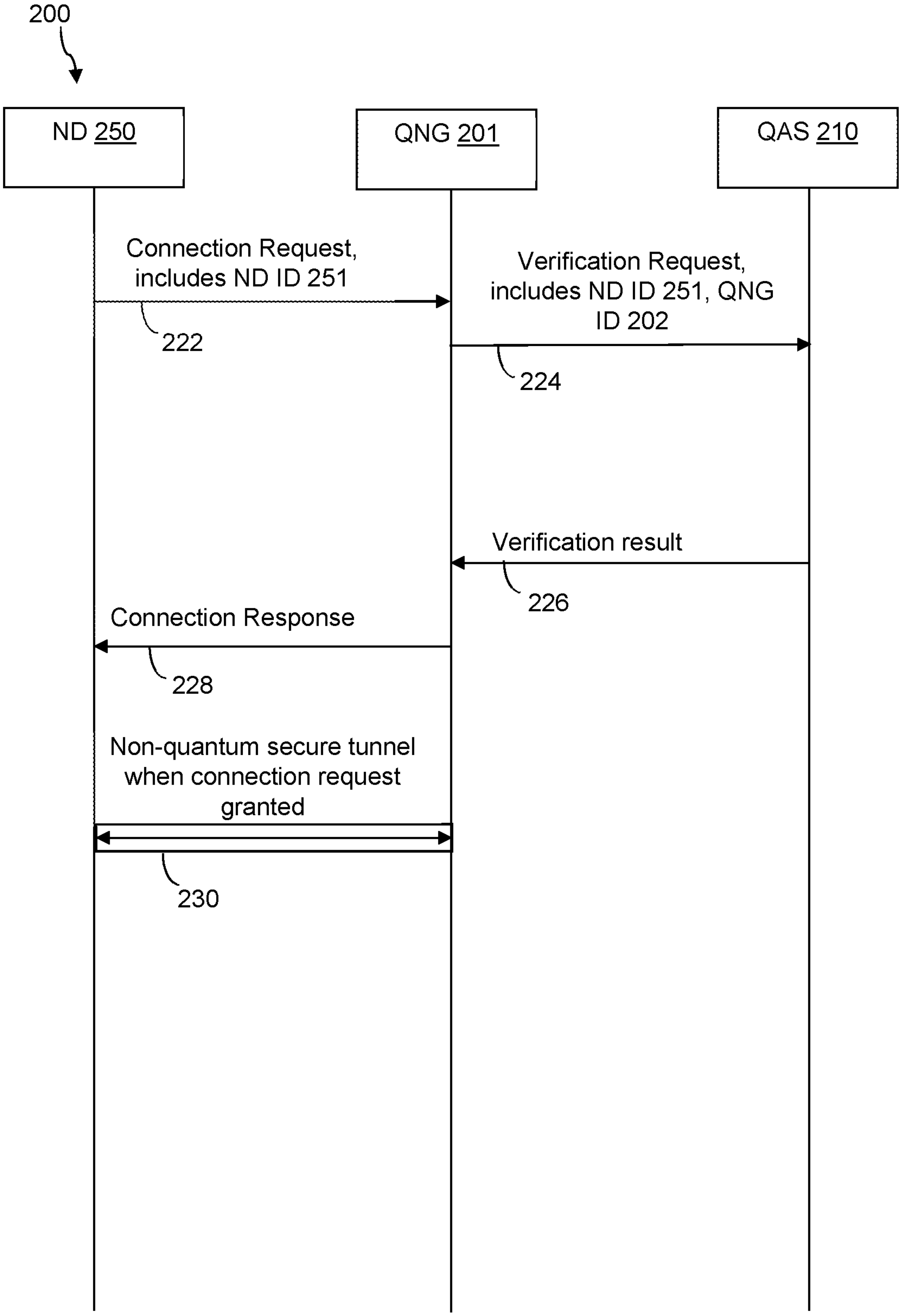
FIG. 2 is a message sequence diagram illustrating a baseline processing operation for secure connection according to an embodiment of the disclosure.
Figure 3:
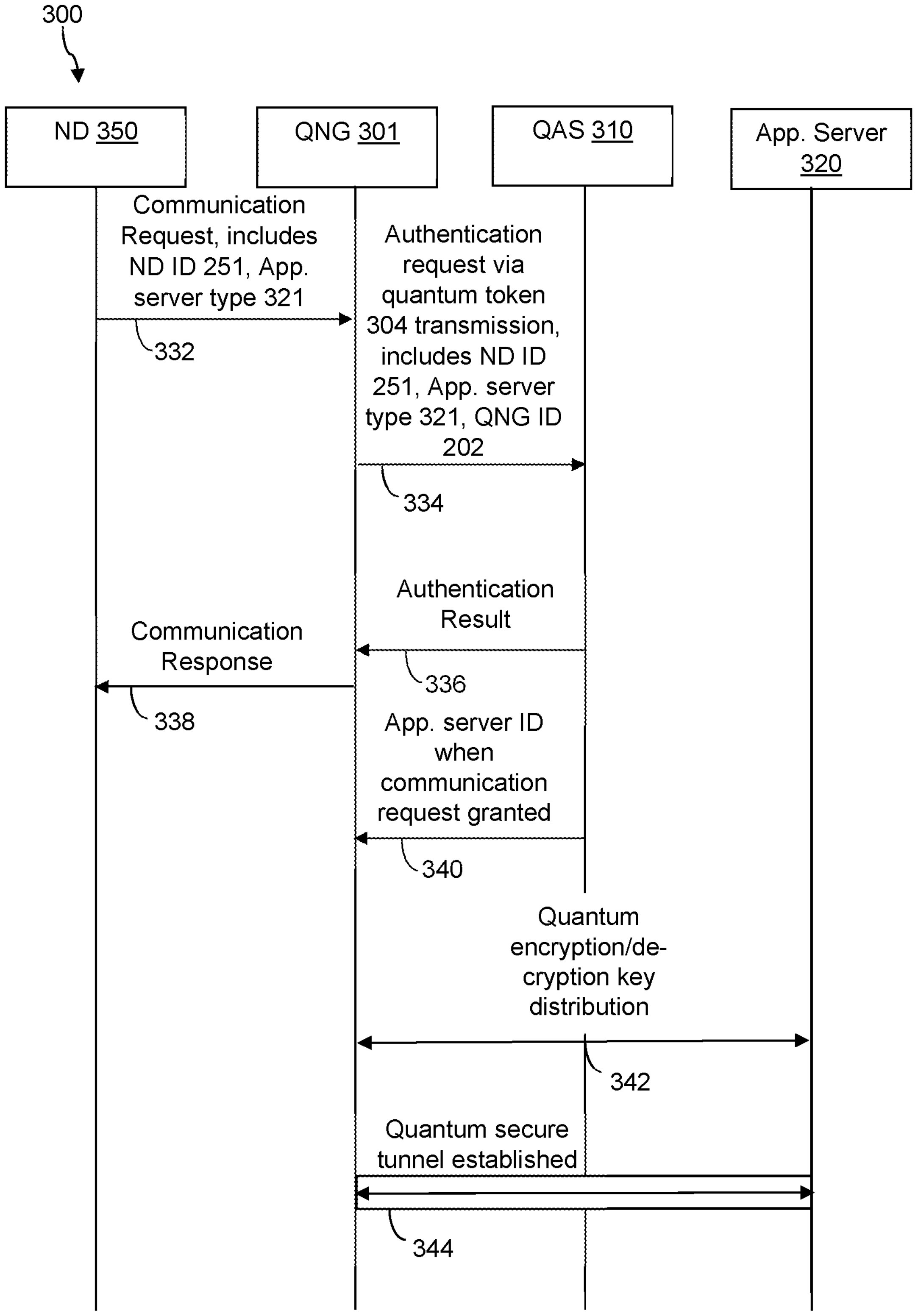
FIG. 3 is a message sequence diagram illustrating quantum processing operation for quantum authentication and secured communication tunnel according to an embodiment of the disclosure.
Figure 4:
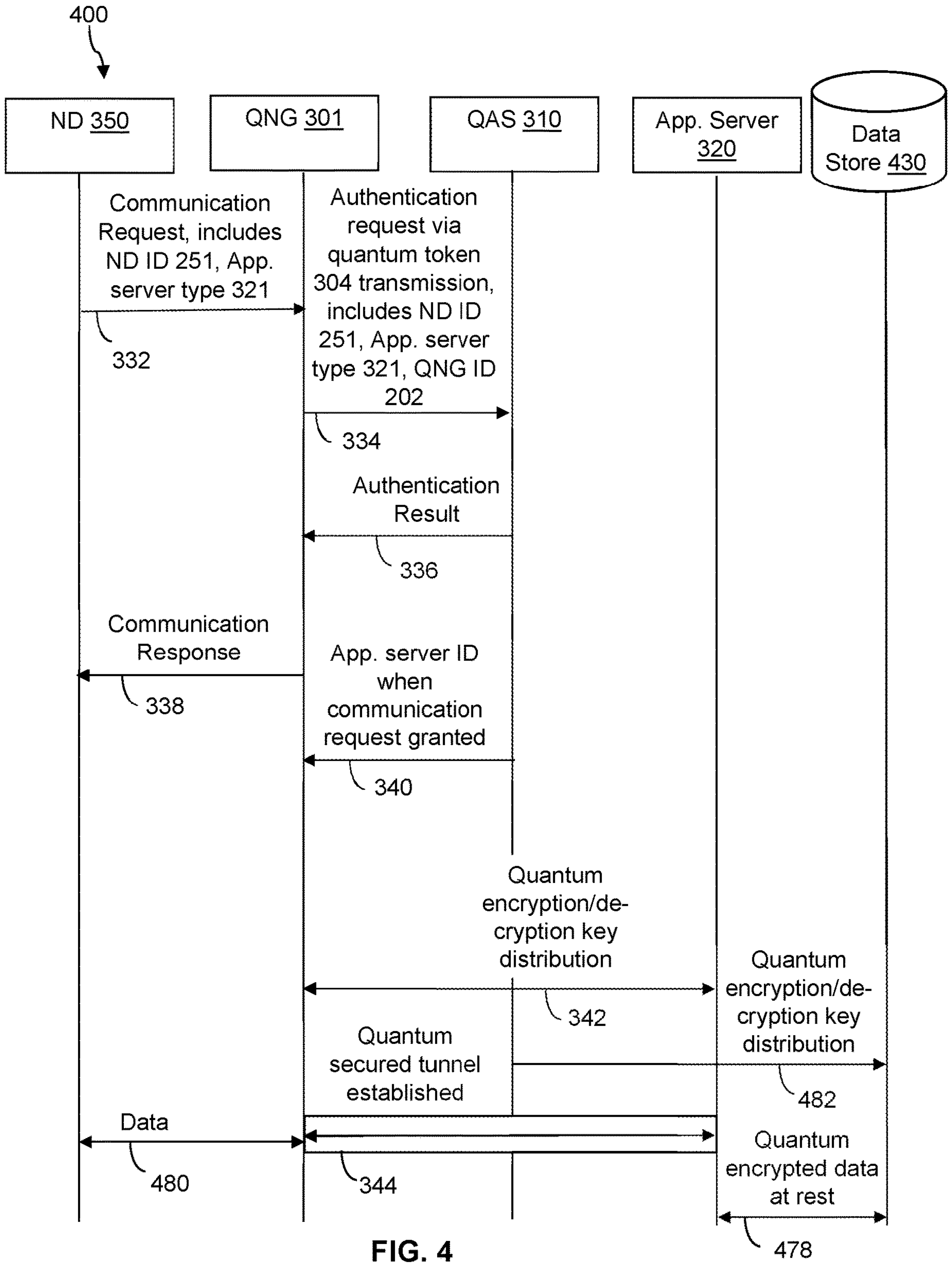
FIG. 4 is a message sequence diagram illustrating quantum processing operation for data encryption according to an embodiment of the disclosure.

Referring now to FIGS. 2-4, shown are message sequence diagrams illustrating communications between the components of the communication system 100 of FIG. 1 for enabling secured communication between quantum equipped devices and non-quantum equipped devices in the communication system 100 of FIG. 1, according to various embodiments of the disclosure. Specifically, FIG. 2 relates to intregration of QNG 101 into the communication system 100 of FIG. 1 to facilitate communication between ND 150 and QAS 110, and verify a connection request for connection between ND 150 and QNG 101. Meanwhile FIGS. 3-4 relate to the authentication of a communication request from ND 150 to communicate with application server 120 in the communication system 100 of FIG. 1, setting up of a quantum secure communication tunnel between QNG 101 and application server 120 for communicating on behalf of ND 150, and storing by the data storage 130, quantum encrypted/decrypted data for data flowing through the communication tunnel for application server 120.

Turning now specifically to FIG. 2, a message sequence diagram illustrating an exemplary baseline processing operation 200 for securing a connection between the ND 250 and the QNG 201 according to an embodiment of the disclosure is shown. In an embodiment, ND 250 (for example, a non-quantum equipped far edge device or a user equipment, such as ND 150 of FIG. 1) may transmit a connection request 222 to QNG 201 (e.g., similar to QNG 101 of FIG. 1). The ND 250 may also transmit security credentials authenticating the ND 250 with the QNG 201. For example, the security credentials may include an ND identifier (e.g., ND ID 251), which may be transmitted along with connection request 222 to confirm the identity of ND 250 as shown in FIG. 2. ND ID 251 may be one or more of a username and password, one-time password, personal identification number (PIN), a smart card, short term token, long term token, biometrics, digital certificates, geolocation, security questions, access codes, universal serial bus (USB) security keys, or any digital information that may associate ND 250 to some form of proof of identity. In some embodiments, a client application (e.g., client application 156) of the ND 250 may generate and transmit the connection request 222 to the QNG 201.

Upon receiving connection request 222, QNG 201 may transmit a verification request 224 to QAS 210 (e.g., similar to QAS 110 of FIG. 1) to verify ND 150. Verification request 224 may include ND ID 251 and a QNG identifier (e.g., QNG ID 202), and may be based on quantum cryptographic keys or any encryption algorithm. The quantum authentication application (e.g., similar to quantum authentication application 115 of QAS 110) may process the verification of connection request 222, for example, by comparing the security credentials of ND 250 and QNG 201 with security data stored in the memory of QAS 210. In some embodiments, QNG 201 and QAS 210 may comprise both non-quantum and quantum-based processing capabilities.

In response to verifying the security credentials of ND 250, QAS 210 may provide a verification result 226 to QNG 201 indicating an authorization or denial of connection request 222. Based on verification result 226, QNG 201 may provide, for example, a connection response 228 to ND 250, in which connection response 228 indicates whether the connection request 222 is granted or denied result. When connection request 222 is granted, a secure tunnel 230 may be created between ND 250 and QNG 201 for secure communications, in which the secure tunnel 230 may be a non-quantum-based communication tunnel. The baseline processing operation 200 described herein illustrates integration of the QNG 201 in the communication network to facilitate communication between ND 250 and QAS 210, and may vary in other examples.

Referring now to FIG. 3, a message sequence diagram illustrating an exemplary quantum processing operation 300 for quantum authentication and quantum secure communication tunnel 300 establishment, according to an embodiment of the disclosure is shown. In an embodiment, ND 350 (e.g., similar to ND 150 of FIG. 1) may transmit a communication request 332 to QNG 301 (e.g., similar to QNG 101 of FIG. 1) to communicate with application server 320 (e.g., similar to application server 120 of FIG. 1) in the network. For example, ND 350 may be a non-quantum equipped far edge device or user equipment trying to use an application implemented on an application server 320 in the network. A client application (e.g., client application 156) of the ND 350 may generate and transmit the communication request 332 to the QNG 301 after a connection request (e.g., connection request 222) has been granted between ND 350 and QNG 301.

In an embodiment, communication request 332 may include ND ID (e.g., ND ID 251) and the type 321 of the application server 320. The QNG 302 may receive the communication request 321. A quantum application (e.g., similar to quantum application 105 of FIG. 1) at the QNG 302 may then generate a quantum token 304, which may be based on ND ID 251, QNG ID 202, and the application server type 321. As described above, quantum token 304 may be any piece of digital data that is used to authenticate the identity of a user or network device. The token data in the quantum token is quantum encrypted and readable by QAS 310, hence the "quantum token" descriptor. The quantum application may then transmit an authentication request 334 to QAS 310 (e.g., similar to the QAS 110 of FIG. 1) for authentication using quantum token 304. Authentication using the quantum token 304 may be executed by a quantum authentication application (e.g., similar to the quantum authentication application 115 of FIG. 1) stored in QAS 310.

In an embodiment, an authentication application (e.g., authentication application 115 of FIG. 1) at QAS 310 may perform authentication on the ND 350 using the quantum token 304 by verifying ND ID 251, QNG ID 202, and the application server type 321, and determining whether ND 350 is permitted to access application server 320 or an application implemented on application server 320. As described above, determining whether ND 350 is permitted to communicate with application server 320 may include, for example, determining whether ND 350 is included in a security group authorized to communicate with application server 320 in which the security group may include identifiers of devices stored in a data store in QAS 310, verifying the location of the QNG with geospatial data of the non-quantum equipped network device, and/or leveraging behavioral analytics to evaluate the historical behavior and usage patterns of the non-quantum equipped network device.

Upon authenticating communication request 332, QAS 310 may provide an authentication result 336 to QNG 301 indicating whether the communication request 332 is granted or denied. In response to authentication result 336, QNG 301 may transmit a communication response 338 to ND 350, in which the communication response 338 indicates whether the communication request 332 is granted or denied. When communication request 332 is granted, QAS

310 may assign and return an application server ID 340 identifying the particular application server 320 to QNG 301. In some embodiments, transmission of communication request 332 and return of application server ID 340 may be via quantum token exchange, for example, such that return of application server ID 340 to QNG 301 may be through quantum encrypted data contained in a token.

QAS 310 may then execute a cryptographic key application (e.g., cryptographic key application 117 of FIG. 1) to generate and distribute quantum encryption/decryption keys 342 to QNG 301 and application server 320 for encrypting and decrypting communications on behalf of ND 350. For example, the cryptographic key application may use quantum key distribution (QKD) to distribute the encryption/decryption keys 342 or any other encryption algorithm via a prior secured communication link. Based on authentication result 336 indicating the granting of the communication request 332, QNG 301 may execute a quantum tunnel application (e.g., quantum tunnel application 106 of FIG. 1) to set up or establish a secure tunnel 344 between QNG 301 and application server 320 for communicating on behalf of ND 350. The secure tunnel 344 may refer to a protected pathway established between QNG 301 and application server 320. The security of the data transmitted through the secure tunnel 344 may be achieved at least in part through (quantum-based and non-quantum-based) encryption and decryption protocols, as described herein. In this manner, ND 350 is able to communicate effectively with application server 320 via QNG 301 through the integration of quantum authentication into the network, and construct a quantum protected tunnel 344 using quantum encryption and decryption keys 342 for data flow in the network. Therefore, communications between QNG 301 and application server 320 on behalf of ND 350, may flow through a secure tunnel, wherein communications entering, flowing through, and exiting the tunnel is quantum encrypted. Thus, QNG 301 may facilitate communication between ND 350, a non-quantum equipped network device, and application server 320, upon authentication of ND 350 and authorization of the communication request by QAS 310. It should be noted that all communication to distribute cryptographic keys between QNG 301 and QAS 310, and all communication to distribute cryptographic keys between QAS 310 and the application server 320 may take place over previously established secure channels.

Referring now to FIG. 4, a message sequence diagram illustrating quantum processing operation for data encryption 400, according to an embodiment of the disclosure is shown. In an embodiment, QNG 301 (e.g., similar to the QNG 101 of FIG. 1) may transmit data 480 received from ND 350 (e.g., similar to the ND 150 of FIG. 1) to application server 320 (e.g., similar to the application server 120 of FIG. 1), upon setting up of communication tunnel 344 between QNG 301 and application server 320. For example, setting up of communication tunnel 344 may be similar to the process described for FIG. 3 above. Data 480 exchanged with application server 320 may be encrypted and decrypted by a server application (e.g., similar to server application 125 of FIG. 1) executed by application server 320, using quantum encryption/decryption keys 342 provided by QAS 310. Thus, application server 320 may provide quantum security to data flowing through communication tunnel 344 by performing the quantum encryption/decryption processing for data traffic flowing through communication tunnel 344. In this manner, QNG 301 may receive data 480 from ND 350, transmit data 480 through communication tunnel 344 to application server 320, which may perform quantum encryption/decryption of data transmitted to application server 320 and data sent back to QNG 301 through the tunnel 344 by application server 320, thereby providing quantum security to data flowing through the network.

In some embodiments, QAS 310 may also assign a particular data storage 430 equipped to store quantum encrypted data 478 at rest, for application server 320. For example, quantum encrypted data 478 may include any data decrypted and processed by application server 420 and not actively used or transferred, which may be re-encrypted and stored in data storage 430 for later retrieval. QAS 310 may assign a data storage (e.g., data storage 430) as described above. For example, QAS 310 may assign data storage 430 based on the privacy requirements of the application, storage requirements of the application (e.g., how much storage is required, storage duration, etc.), identity and location of the application server and data storage, prior assignment, or specific system needs. QAS 310 (e.g., similar to QAS 110 of FIG. 1) may also provide any quantum encryption/decryption keys 482 to data storage 430 (e.g., similar to the data storage 130 of FIG. 1) for securing data 478 stored in data storage 430. Thus, data flowing in the communication tunnel 344, and data 478 stored in data storage 430 may be quantum secured using the quantum encryption/decryption keys 482 provided by QAS 310. It should be noted that the quantum encryption/decryption keys 342 provided to QNG 301 by QAS 310 and the quantum encryption/decryption keys 482 provided to data storage 430 by QAS 310 may be different.

Figure 5:
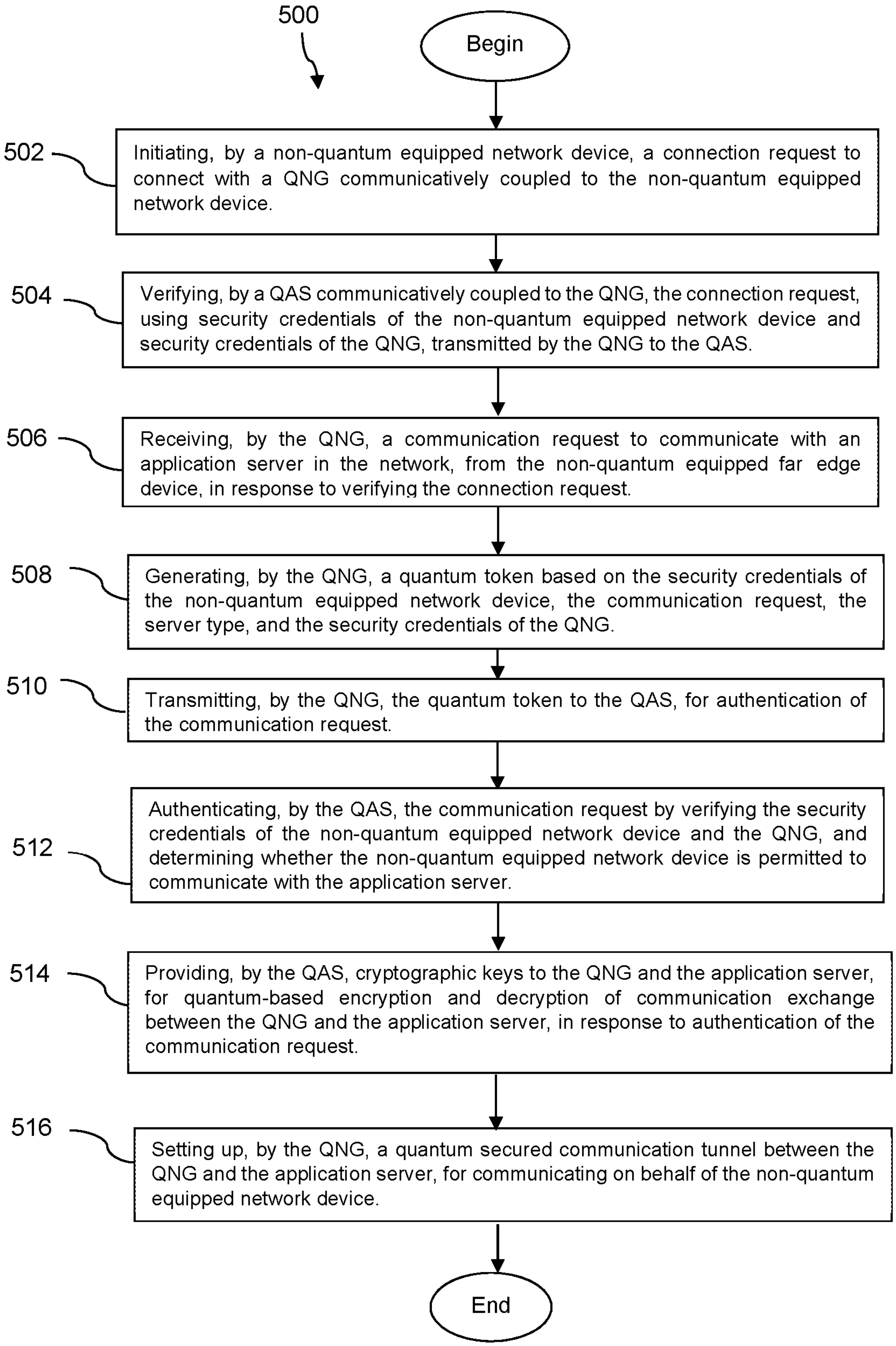
FIG. 5 is a flowchart of a first method for enabling secure communication between non-quantum equipped devices and quantum equipped devices according to an embodiment of the disclosure.

Referring now to FIG. 5, a flowchart of a first method 500 for enabling secure communication between non-quantum equipped devices and quantum equipped devices according to an embodiment of the disclosure is shown. Method 500 may be performed by QNG 101, 201, or 301, and may be implemented after, for example, QNG is integrated into a communication system (e.g., communication system 100) which includes non-quantum equipped devices (e.g., ND 150, 250, 350) and quantum equipped devices (e.g., QAS 110, 210, 310) to facilitate communication between the quantum equipped network devices and the non-quantum equipped network device. Method 500 may be performed after the QNG is communicatively coupled to the ND and the QAS, and after quantum application 105 and quantum tunnel application 106 have been registered and stored at QNG. Method 500 may also be performed after a client application running on ND (e.g., client application 156) is stored and authorized to request connection with QNG in communication system.

At step 502, method 500 comprises initiating by a non-quantum equipped network device (e.g., ND 150, 250, 350), a connection request (e.g., connection request 222) to connect with a QNG (e.g., QNG 101, 201, 301) communicatively coupled to the non-quantum equipped network device in a communication network, for example, communication system 100. The connection request may be executed by the client application running on the non-quantum equipped network device and may include any type of security credentials for identifying the non-quantum equipped network device.

At step 504, method 500 comprises verifying the connection request by a QAS (e.g., QAS 110, 210, 310) communicatively coupled to the QNG, based on the security credentials of the non-quantum equipped network device and the security credentials of the QNG transmitted by the QNG to the QAS. Verification of the connection request transmitted by the QNG, may be executed by a quantum authentication application (e.g., authentication application 115) stored and running in the QAS. As described above, the security credentials may include any type of identifier that may associate the non-quantum equipped network device and QNG to some form of proof of identity which may be initially stored in a memory of the QAS. After verifying the connection request, the QAS may return a verification result to the QNG. Based on the verification result, the QNG may grant or deny the connection request and notify the non-quantum equipped network device.

In response to verifying the connection request, at step 504, and granting the connection request, method 500 may proceed to step 506 with receiving, by the QNG from the non-quantum equipped network device, a communication request (e.g., communication request 332) to communicate with an application server in the network. The communication request may include the security credentials of the non-quantum equipped network device and a server type identifying the type of application server.

Method 500 continues to step 508 with generating, by the QNG, a quantum token (e.g., quantum token 304) by the quantum application executed by the QNG, based on the security credentials of the non-quantum equipped network device, the security credentials of the QNG, and the type of application server. As described above, the quantum token may be any piece of digital data that is used to authenticate the identity of a user or network device. The token data in the quantum token may be quantum encrypted and readable by the QAS hence the "quantum token" descriptor. At step 510, the QNG may transmit the quantum token to the QAS for authentication.

At step 512 of method 500, the QAS may authenticate the quantum token by first verifying the security credentials of the non-quantum equipped network device, and next, determining whether the non-quantum equipped network device is permitted to access the application server or application implemented on the application server. As described above, determining whether the non-quantum equipped network device is permitted to access the application on the application server may be based on whether a security group that is mapped specifically to the application including an identifier of the non-quantum equipped network device. Authentication of the quantum token may be performed by the quantum application executed by the QAS, and determining whether the non-quantum equipped network device is permitted to access the application server or an application implemented on the application server may be performed after the security credentials of the non-quantum equipped network device have been verified. The QAS may transmit the authentication result to the QNG, and based on the authentication result, the QNG may grant or deny the communication request and may notify the non-quantum equipped network device of the authentication result.

Method 500 continues at step 514 with providing, by the QAS, cryptographic keys to the QNG and the application server for quantum-based encryption and decryption of communication between the QNG and application server on behalf of the non-quantum equipped network device, in response to authentication of the communication request. The QAS may use quantum key distribution (QKD) to distribute the encryption/decryption keys or any other encryption algorithm via a prior secured communication link. The QAS may also assign a particular application server to the QNG, and provide an application server identifier or application server identification to the QNG.

Method 500 continues at step 516 with setting up, by the QNG, a communication tunnel (e.g., tunnel 344) between the QNG and the application server for communicating on behalf of the non-quantum equipped network device. The cryptographic keys may be used by the application server to encrypt and decrypt any communication exchange between the QNG and the application server, on behalf of the non-quantum equipped network device. This creates a quantum secured communication tunnel between the QNG and the application server for communicating on behalf of the non-quantum equipped network device. In this manner, the secure communication tunnel between the QNG and the application server is dynamically created in response to authenticating the communication request transmitted by the QNG, assigning an application to the QNG, and providing the cryptographic keys to the QNG and the application server for quantum-based encryption and decryption of communication exchange between the QNG and the application server, on behalf of the non-quantum equipped network device.

Method 500 may include other steps and/or features that are not otherwise shown in FIG. 5. In an embodiment, method 500 may further comprise notifying the non-quantum equipped network device, by the QNG, through a connection response (e.g., connection response 228) the result of the verifying of the connection request (e.g., verification result 226), wherein the result of the verifying of the connection request indicates a granting or denying of the connection request, and notifying the non-quantum equipped network device, by the QNG, through a communication response (e.g., communication response 338) the result of the authenticating of the communication request (e.g., authentication result 336), wherein the result of the authentication of the communication request indicates a granting or denying of the communication request. In some embodiments, method 500 comprises assigning, by the QAS, a particular application server (e.g., application server 120, 320) to the QNG, and returning, by the QAS, an application server identifier (e.g., application server ID 340) to the QNG for the setting up of the communication tunnel. In some embodiments, verifying the connection request includes verifying the first identifier of the non-quantum equipped network device and the second identifier of the QNG by comparing the first identifier and second identifier with identification data stored in the QAS. In some embodiments, authenticating the communication request includes at least one of verifying a presence of the non-quantum equipped network device in a security group that is mapped to the application server, verifying a location of the QNG based on the second identifier in reference to geospatial data of the non-quantum equipped network device or using historical behavior and usage patterns of the non-quantum equipped network device to maintain access control. In some embodiments, method 500 comprises assigning, by the QAS, a data storage (e.g., data storage 430) associated with the application server to store encrypted data at rest (e.g., quantum encrypted data at rest 478) at the data storage.

Figure 6:
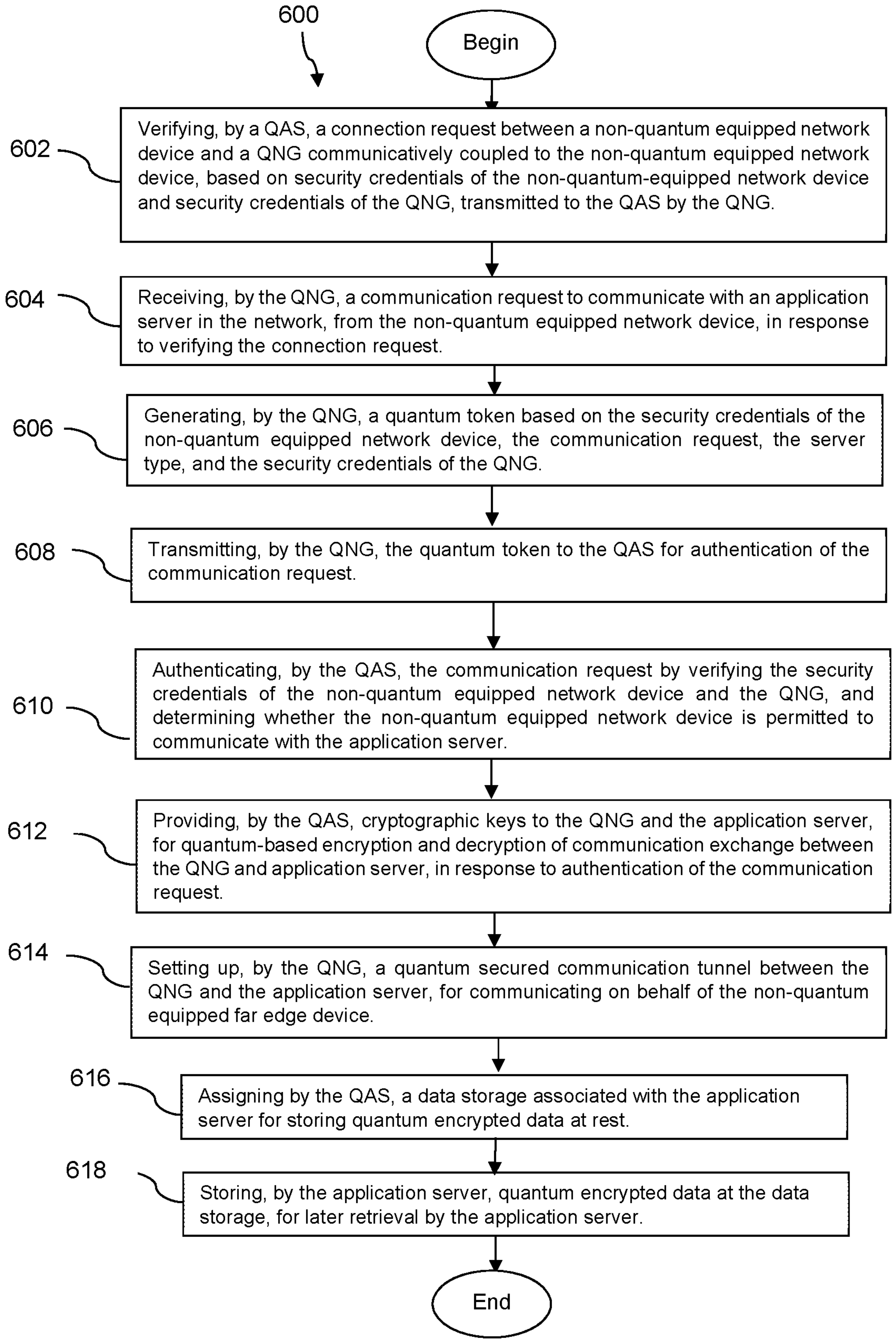
FIG. 6 is a flowchart of a second method for enabling secure communication between non-quantum equipped devices and quantum equipped devices according to an embodiment of the disclosure.

Referring now to FIG. 6, a flowchart of a second method 600, for enabling secure communication between non-quantum equipped devices and quantum equipped devices according to an embodiment of the disclosure is shown. At least some, if not all of method 500 may be performed in method 600. Method 600 begins at step 602 with verifying, by a QAS (e.g., QAS 110, 210, 310), a connection request (e.g., connection request 222) between a non-quantum equipped network device (e.g., ND 150, 250, 350) and a QNG (e.g., QNG 101, 201, 301) communicatively coupled to the non-quantum equipped network device, based on security credentials of the non-quantum-equipped device and security credentials of the QNG transmitted to the QAS by the QNG.

Method 600 continues at step 604 with receiving, by the QNG, a communication request (e.g., communication request 332) to communicate with an application server in the network, from the non-quantum equipped network device, in response to verifying the connection request by the QAS. The communication request may include security credentials of the non-quantum equipped network device and the QNG, and the type of application server.

At step 606, method 600 continues with generating by the QNG, a quantum token (e.g., quantum token 304) based on the security credentials of the non-quantum equipped network device, the communication request, the server type, and the security credentials of the QNG. As described above, the security credentials of the non-quantum equipped network device and the QNG may include an identifier of the non-quantum equipped network device, and an identifier of the QNG respectively. Method 600 continues to step 608 with transmitting the quantum token to the QAS for authentication.

At step 610, method 600 continues with authenticating, by the QAS, the communication request by verifying the security credentials of the non-quantum equipped network device, and the QNG, and determining whether the non-quantum equipped network device is permitted to communicate with the application server. Depending on the authentication result, the QNG may notify the non-quantum equipped network device if the communication request was granted or denied.

Method 600 continues at step 612 with providing, by the QAS, cryptographic keys to the quantum network gateway and the application server, for quantum-based encryption and decryption of communication between the QNG and the application server, in response to authentication of the communication request. The QAS may also assign a particular application server to the QNG and return an application server identifier to the QNG via quantum token exchange.

Method 600 continues at step 614 with setting up, by the QNG, a secure communication tunnel between the QNG and the application server, for communicating on behalf of the non-quantum equipped network device. The communication exchange through the communication tunnel may be encrypted and decrypted by the application server, using the cryptographic keys thereby creating a quantum secured communication tunnel between the QNG and the application server.

Method 600 continues at step 616 with assigning, by the QAS, a data storage (e.g., data storage 430) associated with the application server for storing quantum encrypted data at rest. The QAS may also exchange any authorization that is necessary with the application server and data storage. The application server may set up quantum security with the data storage to encrypt and decrypt any application data at rest.

Method 600 may continue at block 618 with storing, by the application server, quantum encrypted data at rest (e.g., quantum encrypted data 478) at the data storage, for later retrieval by the application server upon receiving communication transmitted to the application server by the QNG on behalf of the non-quantum equipped network device, and processing of the communication by the application server. For example, any information the application server stores over time (greater than a few moments) may be re-encrypted by the application server and stored in the data storage for later retrieval and decryption.

Method 600 may include other steps and/or features that are not otherwise shown in FIG. 6. In an embodiment, method 600 may further comprise assigning, by the QAS, a particular application server (e.g., application server 120, 320) to the QNG, and returning, by the QAS, an application server identifier (e.g., application server ID 340) to the QNG for the setting up of the communication tunnel. In some embodiments, verifying the connection request includes verifying the first security credentials of the non-quantum equipped network device and the second security credentials of the QNG by comparing the first security credentials and the second security credentials with identification data stored in the QAS. In some embodiments, the authenticating of the communication request includes at least one of verifying a presence of the non-quantum equipped network device in a security group that is mapped to the application server, verifying a location of the QNG based on the second identifier in reference to geospatial data of the non-quantum equipped network device, or using historical behavior and usage patterns of the non-quantum equipped network device to maintain access control. In certain embodiments, method 600 further comprises notifying the non-quantum equipped network device, by the QNG, through a connection response (e.g., connection response 228) the result of the verifying of the connection request (e.g., verification result 226), wherein the result of the verifying of the connection request indicates a granting or denying of the connection request, and notifying the non-quantum equipped network device, by the QNG, through a communication response (e.g., communication response 338) the result of the authenticating of the communication request (e.g., authentication result 336), wherein the result of the authenticating of the communication request indicates a granting or denying of the communication request. In some embodiments, method 600 further comprises sending by the non-quantum equipped network device, data (e.g., data 480) to the QNG, in response to the authenticating of the communication request and the setting up of the communication tunnel.

Figure 7:
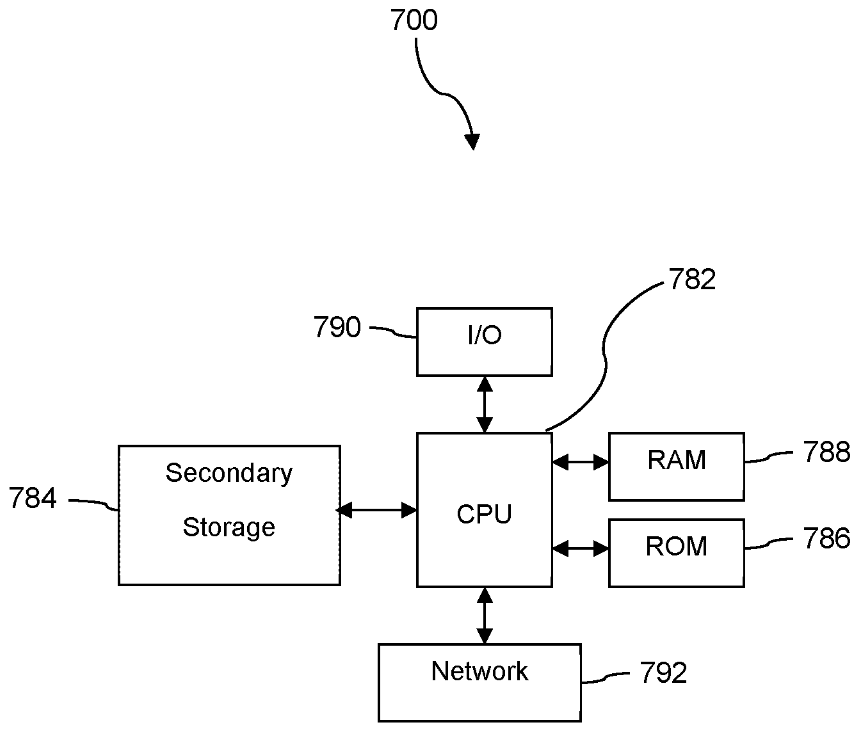
FIG. 7 is a block diagram of a computer system implemented with the communication system of FIG. 1 according to an embodiment of the disclosure.

Referring now to FIG. 7, a computer system 780 suitable for implementing one or more embodiments disclosed herein is shown. The computer system 780 may include a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips. The processor 782 may be a non-quantum processor or a quantum processor.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 780 is turned on or booted, the CPU 782 may execute a computer program or application. For example, the CPU 782 may execute software or firmware stored in the ROM 786 or stored in the RAM 788. In some cases, on boot and/or when the application is initiated, the CPU 782 may copy the application or portions of the application from the secondary storage 784 to the RAM 788 or to memory space within the CPU 782 itself, and the CPU 782 may then execute instructions that the application is comprised of. In some cases, the CPU 782 may copy the application or portions of the application from memory accessed via the network connectivity devices 792 or via the I/O devices 790 to the RAM 788 or to memory space within the CPU 782, and the CPU 782 may then execute instructions that the application is comprised of. During execution, an application may load instructions into the CPU 782, for example load some of the instructions of the application into a cache of the CPU 782. In some contexts, an application that is executed may be said to configure the CPU 782 to do something, e.g., to configure the CPU 782 to perform the function or functions promoted by the subject application. When the CPU 782 is configured in this way by the application, the CPU 782 becomes a specific purpose computer or a specific purpose machine.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 792 may provide wired communication links and/or wireless communication links (e.g., a first network connectivity device 792 may provide a wired communication link and a second network connectivity device 792 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disks based systems may all be considered secondary storage 784), flash drive, ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer system 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A quantum communication system for enabling secured communications between non-quantum equipped and quantum equipped devices, the system comprising:

a non-quantum equipped network device configured to transmit a connection request with first security credentials, wherein the first security credentials includes a first identifier of the non-quantum equipped network device;

a quantum authentication server comprising:

one or more quantum processors;

one or more memories coupled to the one or more quantum processors, and configured to store instructions that, when executed by the one or more quantum processors, cause the quantum authentication server to be configured to verify the connection request using the first security credentials to verify a connection between the non-quantum equipped network device and a quantum network gateway; and the quantum network gateway, enabling communications between the non-quantum equipped network device and the quantum authentication server, the quantum network gateway comprising:

at least one quantum processor;

at least one memory coupled to the at least one quantum processor and one or more processors; and a quantum application comprising instructions stored in the at least one memory, which when executed by the at least one quantum processor, cause the quantum application to:

receive, from the non-quantum equipped network device, a communication request to communicate with an application server in a network, wherein the communication request includes the first security credentials and a server type identifying a type of the application server;

generate a quantum token based on the first security credentials, the communication request, the server type, and a second security credentials, wherein the second security credentials include a second identifier of the quantum network gateway; and transmit, the quantum token to the quantum authentication server for authentication of the communication request;

wherein the quantum authentication server further comprises a quantum authentication application, and wherein the one or more quantum processors of the quantum authentication server is configured to execute the quantum authentication application to:

authenticate the communication request by:

verifying the first security credentials, the second security credentials, and the server type; and determining whether the non-quantum equipped network device is permitted to communicate with the application server based on the first security credentials; and set up, a communication tunnel between the quantum network gateway and the application server for communicating on behalf of the non-quantum equipped network device in response to the non-quantum equipped network device being permitted to communicate with the application server.

2. The quantum communication system of claim 1, wherein the network gateway further comprises a tunnel application stored in the at least one memory, which when executed by the at least one quantum processor, cause the tunnel application to:

set up the communication tunnel between the quantum network gateway and the application server for communicating on behalf of the non-quantum equipped network device, in response to the non-quantum equipped network device being permitted to communicate with the application server.

3. The quantum communication system of claim 1, wherein the authentication server further comprises a cryptographic key application stored in the one or more memories, which when executed by the one or more quantum processors, cause the cryptographic key application to:

generate quantum encryption and decryption keys, for setting up the communication tunnel between the quantum network gateway and the application server for communicating on behalf of the non-quantum equipped network device, in response to the authentication of the communication request by the quantum authentication server; and distribute the quantum encryption and decryption keys, to the quantum network gateway and the application server for encrypting and decrypting communication flowing through the communication tunnel.

4. The quantum communication system of claim 3, wherein the authentication server further comprises an assignment application stored in the one or more memories, which when executed by the one or more quantum processors, cause the assignment application to:

assign the application server to the quantum network gateway in response to the authentication the communication request; and return an application server identifier to the quantum network gateway for the set up of the communication tunnel between the quantum network gateway and the application server.

5. The quantum communication system of claim 1, wherein the non-quantum equipped network device comprises:

at least one processor;

at least one memory coupled to the at least one processor; and a client application comprising instructions stored in the at least one memory of the non-quantum equipped network device, which when executed by the at least one processor, cause the client application to:

transmit the connection request and/or the communication request to the quantum network gateway; and receive at least one of a result of the verifying of the connection request, or a result of the authentication of the communication request from the quantum network gateway.

6. The quantum communication system of claim 5, wherein the quantum application is further configured to:

notify the non-quantum equipped network device of the result of the verifying of the connection request, wherein the result of the verifying of the connection request indicates a granting or denying of the connection request; and notify the non-quantum equipped network device of the result of the authentication of the communication request, wherein the result of the authentication of the communication request indicates a granting or denying of the communication request.

7. The quantum communication system of claim 1, wherein verifying the connection request includes verifying the first identifier of the non-quantum equipped network device and the second identifier of the quantum network gateway by comparing the first identifier of the non-quantum equipped network device and second identifier of the quantum network gateway with identification data stored in the quantum authentication server.

8. The quantum communication system of claim 1, wherein the authentication of the communication request includes at least one of verifying a presence of the non-quantum equipped network device in a security group that is mapped to the application server, verifying a location of the quantum network gateway based on the second identifier in reference to geospatial data of the non-quantum equipped network device or using historical behavior and usage patterns of the non-quantum equipped network device to maintain access control.

9. A method for enabling secured communications between non-quantum-equipped devices and quantum-equipped devices, the method comprising:

initiating, by a non-quantum equipped network device, a connection request between the non-quantum equipped network device and a quantum network gateway communicatively coupled to the non-quantum equipped network device, wherein the connection request comprises first security credentials of the non-quantum equipped network device, the first security credentials including a first identifier of the non-quantum equipped network device;

verifying, by a quantum authentication server, the connection request based on the first security credentials of the non-quantum equipped network device and second security credentials of the quantum network gateway, the second security credentials of the quantum network gateway including a second identifier of the quantum network gateway, wherein the quantum authentication server is communicatively coupled to the quantum network gateway;

receiving, by the quantum network gateway from the non-quantum equipped network device, a communication request to communicate with an application server in a network, in response to verifying the connection request, wherein the communication request includes the first security credentials of the non-quantum equipped network device and a server type identifying a type of the application server;

generating, by the quantum network gateway, a quantum token based on the first security credentials of the non-quantum equipped network device, the communication request, the server type, and the second security credentials;

transmitting, by the quantum network gateway, the quantum token to the quantum authentication server for authentication of the communication request;

authenticating, by the quantum authentication server, the communication request by:

verifying the first security credentials of the non-quantum equipped network device, the second security credentials of the quantum network gateway, and the server type; and determining whether the non-quantum equipped network device is permitted to communicate with the application server;

providing, by the quantum authentication server, cryptographic keys to the quantum network gateway and the application server for quantum-based encryption and decryption of communication between the quantum network gateway and application server, in response to the authenticating of the communication request; and setting up, by the quantum network gateway, a quantum secured communication tunnel between the quantum network gateway and the application server for communicating on behalf of the non-quantum equipped network device, wherein the communication flowing through the quantum secured communication tunnel is encrypted and decrypted by the application server, using the cryptographic keys.

10. The method of claim 9, further comprising:

notifying the non-quantum equipped network device, by the quantum network gateway, a result of the verifying of the connection request, wherein the result of the verifying of the connection request indicates a granting or denying of the connection request; and notifying the non-quantum equipped network device, by the quantum network gateway, a result of the authenticating of the communication request, wherein the result of the authentication of the communication request indicates a granting or denying of the communication request.

11. The method of claim 9, further comprising:

assigning, by the quantum authentication server, a particular application server to the quantum network gateway; and returning, by the quantum authentication server, an application server identifier to the quantum network gateway for the setting up of the communication tunnel.

12. The method of claim 9, wherein verifying the connection request includes verifying the first identifier of the non-quantum equipped network device and the second identifier of the quantum network gateway by comparing the first identifier of the non-quantum equipped network device and second identifier of the quantum network gateway with identification data stored in the quantum authentication server.

13. The method of claim 9, wherein the authenticating of the communication request includes at least one of verifying a presence of the non-quantum equipped network device in a security group that is mapped to the application server, verifying a location of the quantum network gateway based on the second identifier in reference to geospatial data of the non-quantum equipped network device, or using historical behavior and usage patterns of the non-quantum equipped network device to maintain access control.

14. The method of claim 9, further comprising assigning, by the quantum authentication server, a data storage associated with the application server to store encrypted data at the data storage.

15. A method for enabling secured communications between non-quantum-equipped devices and quantum-equipped devices, the method comprising:

verifying, by a quantum authentication server, a connection request between a non-quantum equipped network device and a quantum network gateway communicatively coupled to the non-quantum equipped network device, based on a first security credentials of the non-quantum-equipped device and a second security credentials of the quantum network gateway transmitted to the quantum authentication server by the quantum network gateway, wherein the quantum authentication server is communicatively coupled to the quantum network gateway;

receiving, by the quantum network gateway, a communication request to communicate with an application server in a network, from the non-quantum equipped network device, in response to verifying the connection request by the quantum authentication server, wherein the communication request includes the first security credentials of the non-quantum equipped network device and a server type identifying a type of the application server;

generating, by the quantum network gateway, a quantum token based on the first security credentials of the non-quantum equipped network device, the communication request, the server type, and the second security credentials of the quantum network gateway, wherein the second security credentials of the quantum network gateway include a second identifier of the quantum network gateway;

transmitting, by the quantum network gateway, the quantum token to the quantum authentication server for authentication of the communication request;

authenticating, by the quantum authentication server, the communication request by:

verifying the first security credentials of the non-quantum equipped network device, the second security credentials, and server type; and determining whether the non-quantum equipped network device is permitted to communicate with the application server; and providing, by the quantum authentication server, cryptographic keys to the quantum network gateway and the application server, for quantum-based encryption and decryption of communication between the quantum network gateway and the application server, in response to the authentication of the communication request;

setting up, by the quantum network gateway, a quantum secured communication tunnel between the quantum network gateway and the application server, for communicating on behalf of the non-quantum equipped network device, wherein communication flowing through the quantum secured communication tunnel is encrypted and decrypted by the application server, using the cryptographic keys;

assigning, by the quantum authentication server, a data storage associated with the application server; and storing, by the application server, quantum encrypted data at the data storage, for later retrieval by the application server.

16. The method of claim 15, further comprising:

assigning, by the quantum authentication server, a particular application server to the quantum network gateway; and returning, by the quantum authentication server, an application server identifier to the quantum network gateway for the setting up of the communication tunnel.

17. The method of claim 15, wherein verifying the connection request includes verifying the first security credentials of the non-quantum equipped network device and the second security credentials of the quantum network gateway by comparing the first security credentials of the non-quantum equipped network device and the second security credentials of the quantum network gateway with identification data stored in the quantum authentication server.

18. The method of claim 15, wherein the authenticating of the communication request includes at least one of verifying a presence of the non-quantum equipped network device in a security group that is mapped to the application server, verifying a location of the quantum network gateway based on the second identifier in reference to geospatial data of the non-quantum equipped network device, or using historical behavior and usage patterns of the non-quantum equipped network device to maintain access control.

19. The method of claim 15, further comprising:

notifying the non-quantum equipped network device, by the quantum network gateway, a result of the verifying of the connection request, wherein the result of the verifying of the connection request indicates granting or denying of the connection request; and notifying the non-quantum equipped network device, by the quantum network gateway, a result of the authenticating of the communication request, wherein the result of the authenticating of the communication request indicates granting or denying the communication request.

20. The method of claim 15, further comprising sending by the non-quantum equipped network device, data to the quantum network gateway, in response to the authenticating of the communication request and the setting up of the communication tunnel.

* * * * *